(12) United States Patent
Hanzawa et al.

(10) Patent No.: US 12,203,847 B2
(45) Date of Patent: Jan. 21, 2025

(54) SHAPE MEASUREMENT SYSTEM AND SHAPE MEASUREMENT METHOD

(71) Applicants: NIPPON TELEGRAPH AND TELEPHONE CORPORATION, Tokyo (JP); THE UNIVERSITY OF TOKYO, Tokyo (JP)

(72) Inventors: Nobutomo Hanzawa, Musashino (JP); Kazuhide Nakajima, Musashino (JP); Takashi Matsui, Musashino (JP); Hideaki Murayama, Tokyo (JP); Ryota Wada, Tokyo (JP); Makito Kobayashi, Tokyo (JP)

(73) Assignees: NIPPON TELEGRAPH AND TELEPHONE CORPORATION, Tokyo (JP); THE UNIVERSITY OF TOKYO, Tokyo (JP)

(*) Notice: Subject to any disclaimer, the term of this patent is extended or adjusted under 35 U.S.C. 154(b) by 232 days.

(21) Appl. No.: 17/915,924

(22) PCT Filed: Jun. 3, 2021

(86) PCT No.: PCT/JP2021/021283
§ 371 (c)(1),
(2) Date: Sep. 29, 2022

(87) PCT Pub. No.: WO2021/246497
PCT Pub. Date: Dec. 9, 2021

(65) Prior Publication Data
US 2023/0147800 A1  May 11, 2023

(30) Foreign Application Priority Data
Jun. 5, 2020 (JP) .................. 2020-098349

(51) Int. Cl.
*G01N 21/47* (2006.01)
*G01N 21/63* (2006.01)
*G01N 21/954* (2006.01)

(52) U.S. Cl.
CPC .......... *G01N 21/47* (2013.01); *G01N 21/636* (2013.01); *G01N 21/954* (2013.01);
(Continued)

(58) Field of Classification Search
CPC .... G01N 21/47; G01N 21/636; G01N 21/954; G01N 2021/4709; G01N 2021/638;
(Continued)

(56) References Cited

U.S. PATENT DOCUMENTS 9,829,352 B2 * 11/2017 Xue .................. G01D 5/35361
2008/0084914 A1 * 4/2008 Yamamoto ......... G01D 5/35348
374/E11.015

(Continued)

OTHER PUBLICATIONS

Zhiyong Zhao et al: "'"Curvature and shape distributed sensing using Brillouin scattering in multi-core fibers"'", 2016.
(Continued)

*Primary Examiner* — Isiaka O Akanbi

(57) ABSTRACT

A shape measurement system and method for a three-dimensional shape of a linear object over a long distance with high resolution. The shape measurement system comprises: a multicore optical fiber having a center core positioned in the center of the cross section thereof and three or more outer peripheral cores positioned at equal intervals concentrically with respect to and outside of the center core; a measurement device for measuring the backward Brillouin scattered light distribution in the propagation direction of each core of the multicore optical fiber; and an analysis device for calculating position coordinates, in three-dimensional space, of a linear structure having an unknown three-dimensional shape from the backward Brillouin scat-
(Continued)

tered light distributions of a multicore optical fiber positioned along the linear structure having an unknown three-dimensional shape and a multicore optical fiber positioned along a linear structure having a known three-dimensional shape.

14 Claims, 11 Drawing Sheets

(52) U.S. Cl.
CPC ............... *G01N 2021/4709* (2013.01); *G01N 2021/638* (2013.01); *G01N 2021/9546* (2013.01)

(58) Field of Classification Search
CPC ............ G01N 2021/9546; G01L 1/246; G01B 11/18; G01B 11/2513; G02B 26/10; G02B 6/0008; G02B 6/0288; G02B 6/3624; G02B 21/0028; G02B 21/0076; G02B 26/02; G02B 6/02076; G02B 2006/0098; G01D 5/268; G01J 3/30; G01M 11/025
USPC .................................................. 356/601, 610
See application file for complete search history.

(56) References Cited

U.S. PATENT DOCUMENTS

| | | | |
|---|---|---|---|
| 2008/0130707 A1* | 6/2008 | Yamamoto | G01K 11/32 374/E11.015 |
| 2015/0285626 A1* | 10/2015 | Yamauchi | G01D 5/35358 356/32 |
| 2017/0017075 A1* | 1/2017 | Reddy | G02B 21/0028 |
| 2018/0023948 A1* | 1/2018 | Bennett | G01K 11/32 356/601 |
| 2019/0067895 A1* | 2/2019 | Stephen | H01S 3/0941 |
| 2021/0116265 A1* | 4/2021 | Tadakuma | G01D 5/3538 |
| 2022/0220670 A1* | 7/2022 | Erlendsson | H01B 9/005 |
| 2022/0390224 A1* | 12/2022 | Ju | C03B 37/01 |

OTHER PUBLICATIONS

Zhao Zhiyong et al: "Distributed multicore fiber sensors". Feb. 22, 2020.
Roger G. Duncan et al., "High-accuracy fiber-optic shape sensing", https://doi.org/10.1117/12.720914, searched on Apr. 30, 2020.
Yong-Lae Park et al., "Real-Time Estimation of 3-D Needle Shape and Deflection for MRI-Guided Interventions", IEEE/ASME Transactions on Mechatronics, vol. 15, No. 6, Dec. 2010.

* cited by examiner

Fig. 8
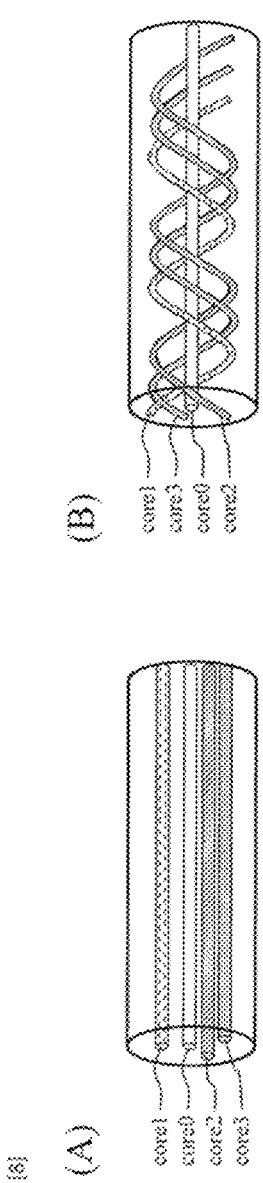
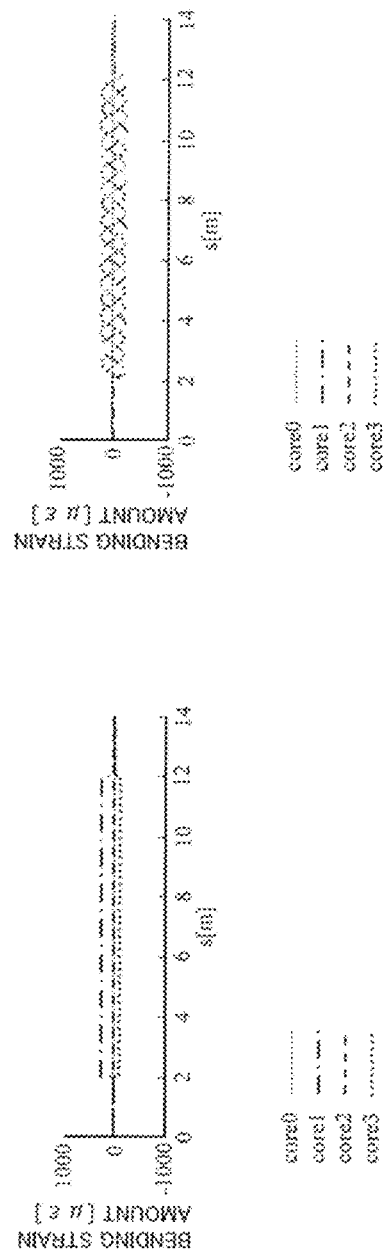

Fig. 10
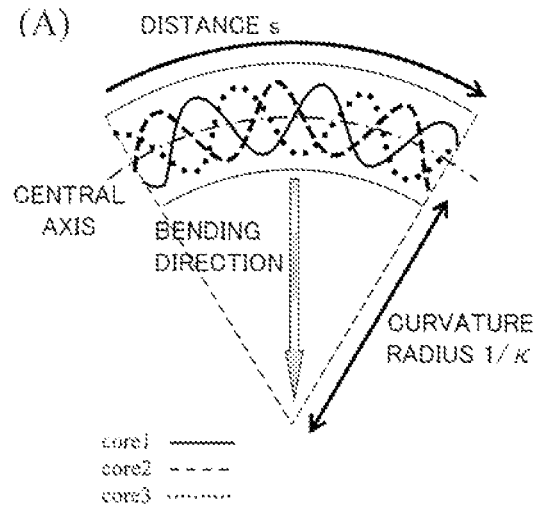
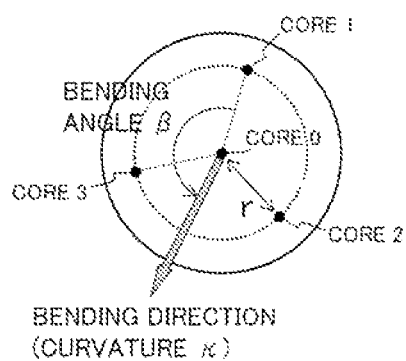
Fig. 11
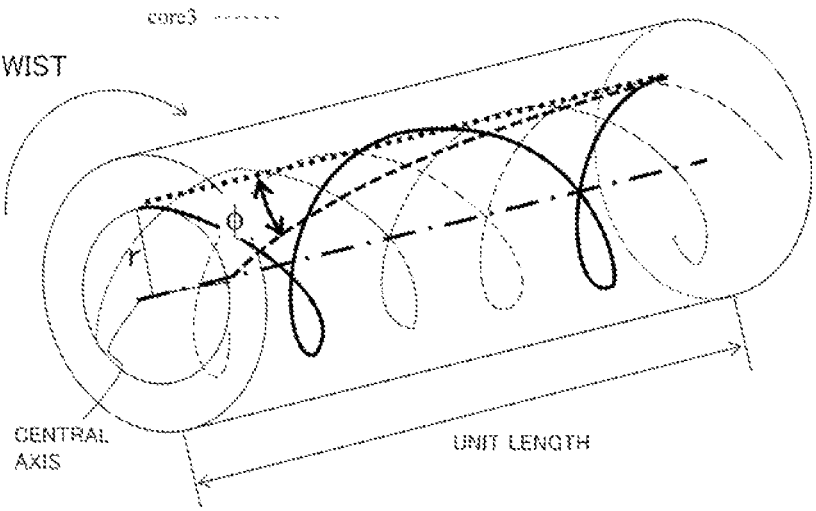

SHAPE MEASUREMENT SYSTEM AND SHAPE MEASUREMENT METHOD

CROSS-REFERENCE TO RELATED APPLICATIONS

This application is a 371 U.S. National Phase of International Application No. PCT/JP2021/021283, filed on Jun. 3, 2021, which claims priority to Japanese Patent Application No. 2020-098349, filed Jun. 5, 2020. The entire disclosure of the above applications are incorporated herein by reference.

TECHNICAL FIELD

This disclosure relates to a device and a method of deriving a three-dimensional shape of a target to be measured, such as a pipeline and a submarine cable, by a reflectometry technique using an optical fiber.

BACKGROUND ART

There has been proposed a technique of measuring and analyzing a reflection spectrum in a frequency domain of each core of a multi-core optical fiber by optical frequency domain reflectometry (OFDR) to derive a three-dimensional shape of a target to be measured (for example, see Non-Patent Literature 1). Additionally, there has been proposed a method of adding a fiber bragg grating (FBG) to a total length of a sensing medium (optical fiber) to improve measurement resolution (for example, see Non-Patent Literature 2).

CITATION LIST

Non-Patent Literature

Non-Patent Literature 1: Roger G. Duncan, etc., "High-accuracy fiber-optic shape sensing", https://doi.org/10.1117/12.720914, searched on Apr. 30, 2020

Non-Patent Literature 2: Yong-Lae Park, etc., "Real-Time Estimation of 3-D Needle Shape and Deflection for MRI-Guided Interventions", IEEE/ASME TRANSACTIONS ON MECHATRONICS, VOL. 15, NO. 6, DECEMBER 2010

SUMMARY OF INVENTION

Technical Problem

When deriving a three-dimensional shape of a target to be measured by OFDR is attempted, the following difficulties occur.

(1) Although the OFDR can achieve high resolution in the order of several tens of millimeters, a measurement distance is limited to about several tens of meters and a long-distance three-dimensional shape is difficult to derive.

(2) When an FBG is added to an optical fiber, ease of manufacturing and economic efficiency of the optical fiber are difficult to improve.

(3) A technique of performing shape identification by quasi-distributed measurement, such as addition of the FBG, has a constraint on a count of measurement points, and the shape identification over a long distance is difficult.

(4) In a case of a form in which the optical fiber to which the FBG is added is embedded in the target to be measured of a nonlinear material, a center frequency of reflection by the FBG is changed due to temperature and stress, and non-linearity is also generated in a strain and a curvature of the optical fiber to be measured, therefore making it difficult to identify a shape change of an object to be measured.

In order to solve the problems, an object of the present invention is to provide a shape measurement system and a shape measurement method that allow deriving a three-dimensional shape of a linear object to be measured over a long distance and with high resolution.

Solution to Problem

In order to achieve the above-described object, the shape measurement system according to the present invention analyzes data obtained by Brillouin optical time domain reflectometry (BOTDR) using a multi-core optical fiber having a predetermined core arrangement as a sensing medium.

Specifically, a shape measurement system according to the present invention includes: a multi-core optical fiber including a center core arranged in a center of a cross section of the multi-core optical fiber and three or more outer peripheral cores arranged at equal intervals on an outside of the center core and in a concentric manner; a measuring device that measures a backward Brillouin scattering light distribution in a propagation direction of each core of the multi-core optical fiber; and an analysis device that computes positional coordinates in a three-dimensional space of a linear structural object having an unknown three-dimensional shape from the backward Brillouin scattering light distribution of the multi-core optical fiber arranged along the linear structural object having the unknown three-dimensional shape and the multi-core optical fiber arranged along a linear structural object having an already-known three-dimensional shape, and identifies its time change.

A shape measurement method according to the present invention includes: arranging a multi-core optical fiber having a center core arranged in a center of a cross section of the multi-core optical fiber and three or more and six or less outer peripheral cores arranged at equal intervals on an outside of the center core and in a concentric manner along a linear structural object; measuring a backward Brillouin scattering light distribution in a propagation direction of each core of the multi-core optical fiber; and computing positional coordinates in a three-dimensional space of a linear structural object having an unknown three-dimensional shape from the backward Brillouin scattering light distribution of the multi-core optical fiber arranged along the linear structural object having the unknown three-dimensional shape and the multi-core optical fiber arranged along a linear structural object having an already-known three-dimensional shape, and identifying its time change.

By measuring a backward Brillouin scattering light for each core of the multi-core optical fiber, a long-distance measurement is ensured. By keeping a center-to-center distance between the center core and the outer peripheral cores of the multi-core optical fiber and distances between adjacent outer peripheral cores, a slight fluctuation of the object to be measured can be detected. Therefore, the present invention can provide the shape measurement system and the shape measurement method that allow deriving a three-dimensional shape of a linear object to be measured over a long distance and with high resolution.

A specific analysis method is as follows.

When a position in a longitudinal direction of the multi-core optical fiber is defined as z, the analysis device performs: calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape; calculating a bending strain ε of each of the outer peripheral cores by subtracting the difference in strain of the center core from the difference in strain of each of the outer peripheral cores; calculating a curvature κ and a bending angle β at the position z of the multi-core optical fiber from the bending strain ε of each of the outer peripheral cores using a relational expression (1), and calculating a torsion by differentiating the bending angle β by an arc length; and computing positional coordinates in the three-dimensional space of the linear structural object having the unknown three-dimensional shape from the curvature κ and the torsion at the position z using Frenet-Serret formulas, and identifying its time change. Note that the bending angle β represents an angle formed by a vector connecting an MCF center and a center of curvature and a reference direction vector, for example, a vector connecting the MCF center and a certain specific core, on an MCF cross section.

$$\varepsilon = r \cdot \kappa \cdot \cos(\alpha - \beta) \quad \text{[Relational Expression (1)]}$$

where r is a center-to-center distance between the center core and the outer peripheral cores, and α is an angle representing a position of the outer peripheral core on a cross section of the multi-core optical fiber.

In this method, when the multi-core optical fiber is placed along a structural object, an error may be caused in a measurement result by occurrence of an unintended twist. In this case, it is preferred that the multi-core optical fiber is provided with an already-known twist, and when the positional coordinates are computed, based on a twisting strain generated in the multi-core optical fiber and a strain by the already-known twist, the analysis device estimates an unintended twist generated when the multi-core optical fiber is arranged along the linear structural object having the unknown three-dimensional shape and removes an influence by the unintended twist.

In this case, a specific analysis method is as follows.

When a position in a longitudinal direction of the multi-core optical fiber is defined as z, the analysis device performs: calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape; calculating a bending strain $\varepsilon_{bending,i}$ of each of the outer peripheral cores by subtracting the difference in strain of the center core from the difference in strain of each of the outer peripheral cores; calculating a curvature κ and a bending angle β at the position z of the multi-core optical fiber from the bending strain $\varepsilon_{bending,i}$ of each of the outer peripheral cores using a relational expression (2) of removing an influence by the unintended twist; and computing positional coordinates in the three-dimensional space of the linear structural object having the unknown three-dimensional shape from the curvature κ and the bending angle β at the position z using Frenet-Serret formulas.

$$\Sigma_{bending,i} = k_1 \kappa r \cos(\omega_i - \beta) \quad \text{[Relational Expression (2)]}$$

where r is a center-to-center distance between the center core and the outer peripheral cores, $k_1$ is a correction coefficient of a twist expressed by Formula (3), ν is a Poisson's ratio of the multi-core optical fiber, $a_i$ is an initial angle of a core i, $\omega_i$ is an angle representing a position of the outer peripheral cores on a cross section at the position z of the multi-core optical fiber expressed by Formula (4), p is a spin rate of the outer peripheral cores, $\varepsilon_{twisting}$ is a twisting strain generated at the position z of the multi-core optical fiber, φ(z) is a specific angle of twist at the position z of the multi-core optical fiber expressed by Formula (5), and $k_2$ is a correction coefficient of a twist expressed by Formula (6).

[Math. 3]
$$k_1 = \frac{1 - \nu(2\pi pr)^2}{(2\pi pr)^2 + 1} \quad (3)$$

[Math. 4]
$$\omega_i = a_i + \int_0^S (2\pi p + \phi(z))dz \quad (4)$$

[Math. 5]
$$\phi(z) = \frac{\varepsilon_{twisting}}{k_2 r} \quad (5)$$

[Math. 6]
$$k_2 = \frac{2\pi pr}{(2\pi pr)^2 + 1} \quad (6)$$

In this case, it is preferred that the analysis device computes a spin rate p of the outer peripheral cores from a cyclic fluctuation of the bending strain $\varepsilon_{bending,i}$ of each of the outer peripheral cores. Even an error in the number of twists can be taken into consideration by a manufacturing error of the multi-core optical fiber, and a shape change of an object to be measured can be identified with high accuracy.

In the multi-core optical fiber, it is preferred that a count of the outer peripheral cores is three or more, and a cladding diameter is 375 μm or more.

In the multi-core optical fiber, it is preferred that a center-to-center distance between the center core and the outer peripheral cores is 120 μm or more.

A fan-in/fan-out (FIFO) device can be easily achieved by bundling existing single mode fibers (with a cladding diameter of 125 μm). As a space between the centers of the center core and the outer peripheral cores is wider, a strain generated in the outer peripheral cores increases, and a wide dynamic range can be realized.

The above-described respective present inventions can be combined wherever possible.

Advantageous Effects of Invention

The present invention can provide a shape measurement system and a shape measurement method that allow deriving a three-dimensional shape of a linear object to be measured over a long distance and with high resolution.

BRIEF DESCRIPTION OF DRAWINGS

FIG. 8 is drawings describing the multi-core optical fiber included in the shape measurement system according to the present invention.

FIG. 10 is drawings describing the multi-core optical fiber included in the shape measurement system according to the present invention.

FIG. 11 is a drawing describing a specific angle of twist of a multi-core optical fiber.

DESCRIPTION OF EMBODIMENTS

Figure 1:
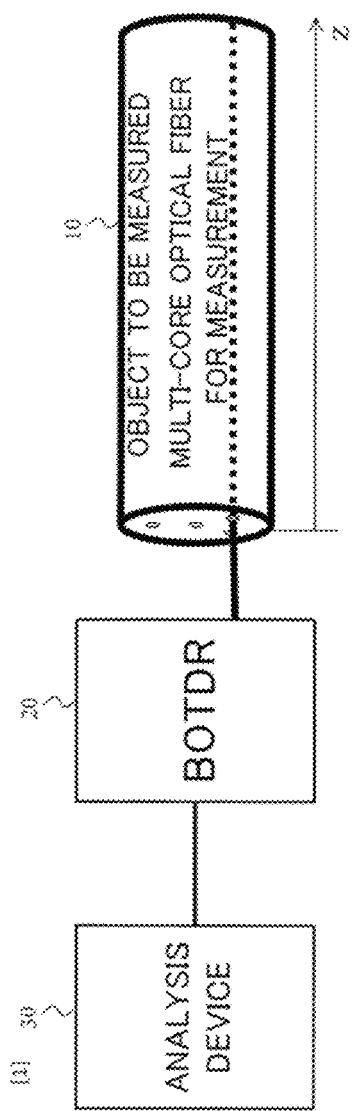
FIG. 1 is a drawing describing a configuration of a shape measurement system according to the present invention.

With reference to the attached drawings, embodiments of the present invention will be described. The embodiments described below are working examples of the present invention, and the present invention is not limited to the following embodiments. In the specification and the drawings, components having the same reference numerals indicate mutually identical components.

Embodiment 1

FIG. 1 is a drawing describing a shape measurement system of the embodiment. The shape measurement system includes a multi-core optical fiber 10 having a center core 11 arranged in a center of a cross section and three or more outer peripheral cores 12 arranged at equal intervals on an outside of the center core 11 and in a concentric manner, a measuring device 20 that measures a backward Brillouin scattering light distribution in a propagation direction of each core of the multi-core optical fiber 10, and an analysis device 30 that computes positional coordinates in a three-dimensional space of a linear structural object having an unknown three-dimensional shape from the backward Brillouin scattering light distribution of the multi-core optical fiber 10 arranged along the linear structural object having an unknown three-dimensional shape and the multi-core optical fiber 10 arranged along a linear structural object having an already-known three-dimensional shape to identify its time change.

In FIG. 1, an example in which one specific core of the multi-core optical fiber 10 is connected to the measuring device 20 that measures the backward Brillouin scattering light distribution is illustrated. Another configuration may be in a form in which the multi-core optical fiber 10 is connected to the measuring device 20 via a fan-out mechanism that separates each core of a multi-core optical fiber into single core optical fibers and an optical switch.

The shape measurement system includes the multi-core optical fiber 10 that is a sensing medium, the measuring device (BOTDR) 20 that detects a backward Brillouin scattering light in the propagation direction of each core of the multi-core optical fiber 10, and the analysis device 30 that analyzes measurement data obtained by the BOTDR 12.

Figure 2:
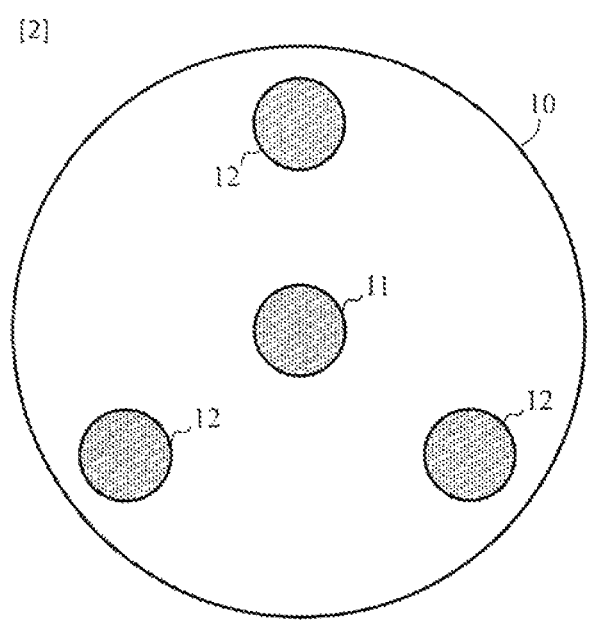
FIG. 2 is a drawing describing a cross section of a multi-core optical fiber of the shape measurement system according to the present invention.

The multi-core optical fiber 10 is installed along a longitudinal direction of a linear structural object that is a target to be measured. The linear structural object is, for example, a pipeline, a riser (pipe through which a fluid flows from a sea bottom to a facility above sea level in offshore drilling and marine production), a submarine cable, and the like. FIG. 2 is a drawing describing the cross section of the multi-core optical fiber 10. The multi-core optical fiber 10 has a total of four cores which are a center core located in the center of the cross section and outer peripheral cores arranged mostly at equal intervals mostly on an identical circumference from the center of the cross section. In the embodiment, while cores having a mostly equal refractive index distribution and optical property are used as the four cores, cores may have a structure in which they are arranged such that the refractive index distribution and the optical property of the respective cores are purposely different.

Restrictions of a count of cores are as follows. When the count of cores is three or less (two or less outer peripheral cores), shape identification cannot be performed. On the other hand, when the count of cores is five or more (four or more outer peripheral cores), the aspect of measurement accuracy improves, but a measurement time period increases by the count of cores.

A circle having a certain radius can be surrounded by six circles having an identical radius that are in contact with the circle. In this case, a total count of the circles is seven. That is, a multi-core optical fiber having a core position when seven single core optical fibers having an identical diameter are arranged in a close packed manner can be formed, allowing easily making a FIFO.

On the other hand, when a count of outer peripheral circles becomes seven or more (the total count of circles is eight or more), gaps are generated between the center circle and the outer peripheral circles by arranging seven or more circles around one circle. That is, eight or more single core optical fibers having an identical diameter cannot be arranged in a close packed manner, a cladding diameter of the multi-core optical fiber increases, and it becomes difficult to make a fan-in/fan-out (FIFO).

Therefore, the count of outer peripheral cores in the multi-core optical fiber is preferably three or more and six or less.

The multi-core optical fiber 10 has a cladding outer diameter (>125 μm) larger than that of a general optical fiber for communication. A center-to-center distance between the center core 11 arranged in the center of the optical fiber and the outer peripheral cores 12 arranged at an outer periphery of the center core 11 is set to larger than 30 μm. The reason is that in a typical multi-core optical fiber having a cladding outer diameter of 125 μm, the center-to-center distance between the center core and the outer peripheral cores that can be arranged to reduce an influence, such as leakage loss, is approximately 30 μm.

Figure 3:
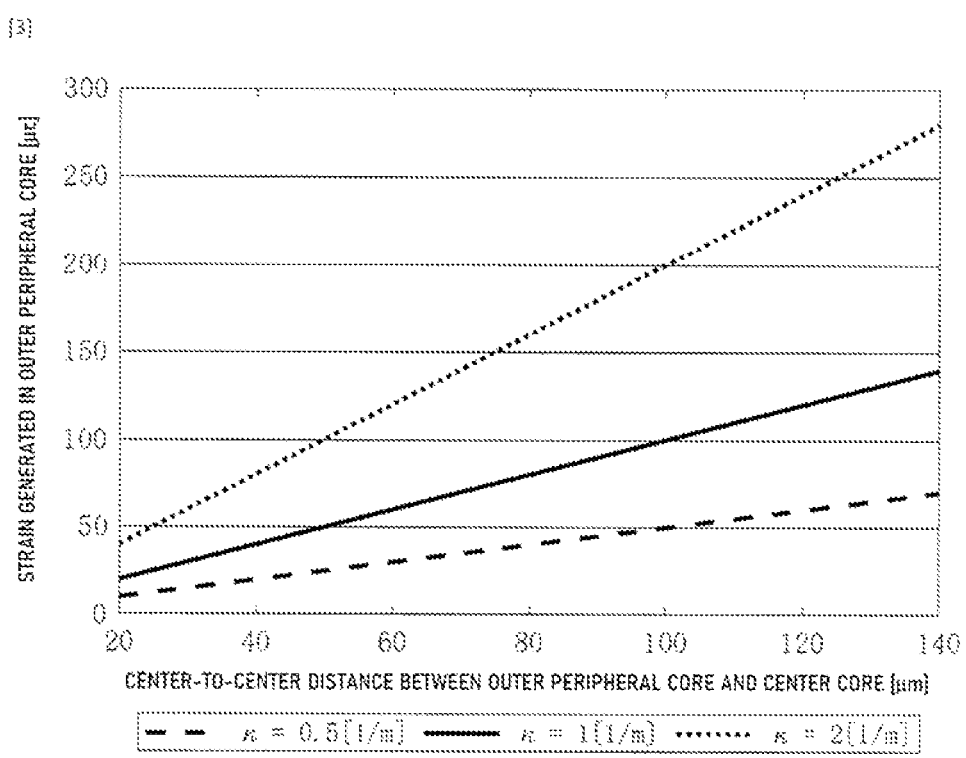
FIG. 3 is a drawing describing an effect of the shape measurement system according to the present invention.

FIG. 3 is a drawing describing a relationship between the center-to-center distance and strain amounts of the outer peripheral cores 12 relative to curvatures of the center of the multi-core optical fiber 10 when ($\alpha-\beta$) is assumed to be zero in a relational expression (1). From FIG. 3, it can be seen that when the center-to-center distance between the center core 11 and the outer peripheral cores 12 is 120 μm or more, a strain amount of five times or more the strain amount obtained in the typical multi-core optical fiber having a cladding outer diameter of 125 μm can be obtained even in a curvature $\kappa=0.5[1/m]$. This means that by lengthening the center-to-center distance between the center core 11 and the outer peripheral cores 12, a sensitivity can improve to a shape change with a small curvature generated in the multi-core optical fiber 10.

As described above, since an FIFO device can be easily achieved by bundling existing single mode fibers (cladding diameter of 125 μm), and the center-to-center distance between the center core 11 and the outer peripheral cores 12 of the multi-core optical fiber 10 becomes 125 μm by using the FIFO made of the existing single mode fibers and a sufficient sensitivity can be obtained to a small shape change, in the embodiment, the cladding outer diameter of the multi-core optical fiber 10 is set to 375 μm (=125 μm×3) to conduct a study.

Next, using FIG. 4, a shape measurement method of measuring a shape change of an object to be measured using the multi-core optical fiber 10 will be described. The shape measurement method performs arranging the multi-core optical fiber 10 along a linear structural object (Step S01), measuring a backward Brillouin scattering light distribution in a propagation direction of each core of the multi-core optical fiber 10 (Step S02), and computing positional coordinates in a three-dimensional space of a linear structural object having an unknown three-dimensional shape from the backward Brillouin scattering light distribution of the multi-core optical fiber 10 arranged along the linear structural object having the unknown three-dimensional shape and the multi-core optical fiber 10 arranged along a linear structural object having an already-known three-dimensional shape to identify the time change (Step S03). The measuring device 20 performs Step S02, and the analysis device 30 performs Step S03. In Step S02, temperature dependence of a Brillouin frequency shift is preferably corrected.

Step S03 will be described in more detail, and a position in the longitudinal direction from the measuring device 20 to the multi-core optical fiber 10 is defined as z.

In Step S03, calculating a difference in strain at the position z that is a difference between a strain amount at the position z of each core of the multi-core optical fiber 50 obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape (Step S31), calculating a bending strain ε of each of the outer peripheral cores by subtracting the difference in strain of the center core from the difference in strain of each of the outer peripheral cores (Step S32), calculating a curvature κ and a bending angle β at the position z of the multi-core optical fiber from the bending strain ε of each of the outer peripheral cores using the relational expression (1) (Step S33) and calculating a torsion by differentiating the bending angle β by an arc length, and computing the positional coordinates in the three-dimensional space of the linear structural object having the unknown three-dimensional shape from the curvature κ and the torsion at the position z using Frenet-Serret formulas to identify the time change (Step S34), are performed.

Figure 5:
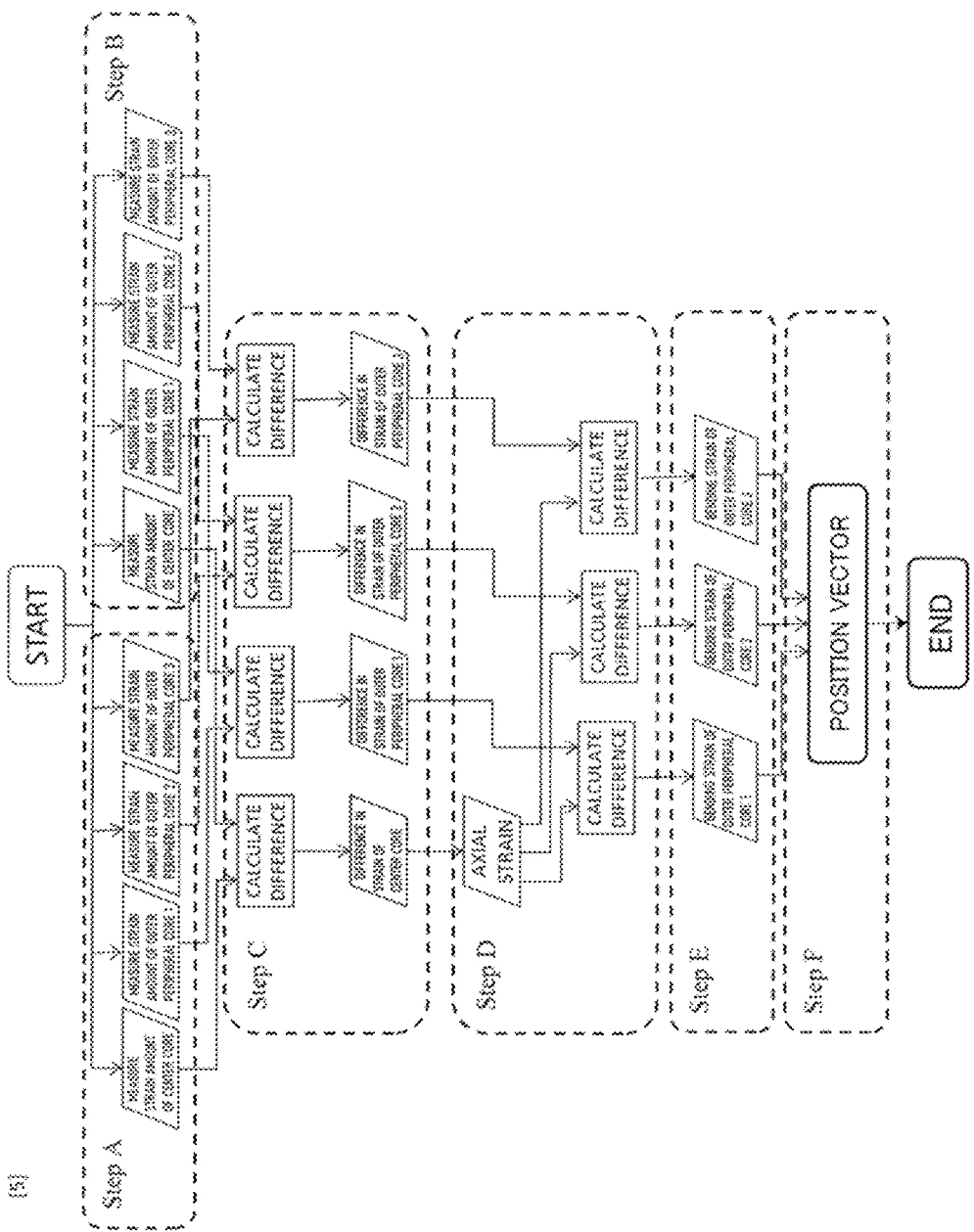
FIG. 5 is a drawing describing the shape measurement method according to the present invention.

FIG. 5 is a drawing describing a specific procedure when a linear structural object having an unknown three-dimensional shape is measured by the shape measurement method.

[Step A]
First, the multi-core optical fiber 10 is laid along a linear structural object having an already-known three-dimensional shape (for example, a water service pipe or the like that is already laid), and a distribution property of a backward Brillouin scattering light of each core in a steady state (reference state) is acquired. This is defined as reference data.

[Step B]
Next, a distribution property of the backward Brillouin scattering light of each core is acquired again in a state where the three-dimensional shape of the linear structural object is changed (for example, a water service pipe or the like that is assumed to be deformed due to an earthquake or the like). This is defined as comparison data.

[Step C]
Next, a difference between the comparison data and the reference data is calculated for each core and for each position z to derive a difference in strain.

[Step D]
Next, the difference in strain of the center core is subtracted from the difference in strain of each of the outer peripheral cores to derive the bending strain ε at the position z for each of the outer peripheral cores.

[Step E]
To the relational expression (1) of the bending strain ε of the outer peripheral cores and the curvature κ and bending angle β of the multi-core optical fiber 10, ε derived in Step D is assigned.

$$\varepsilon = r \cdot \kappa \cdot \cos(\alpha - \beta) \qquad \text{[Relational Expression (1)]}$$

where r is the center-to-center distance between the center core 11 and the outer peripheral cores 12, and α is an angle representing a position of the outer peripheral cores 12 on the cross section of the multi-core optical fiber 10. For example, r is 125 μm, and α is 0°, 120°, and 240° for each of the outer peripheral cores.

In the embodiment, since there are three outer peripheral cores, simultaneous equations with three variables are obtained. From this expression, the curvature κ and the bending angle β at the position z are computed. Here, although the bending strain ε is different for each core, the curvature κ and the bending angle β are equal for any core, and therefore, the curvature κ and the bending angle β at the position z are determined by the least-square method.

[Step F]
Using the Frenet-Serret formulas, from the curvature κ and the bending angle β for each distance z determined in Step E, a position vector (three-dimensional shape) of the multi-core optical fiber 10 is determined. In order to improve position accuracy, the three-dimensional shape is preferably corrected using an already-known ending point.

Working Example 1

Figure 6:
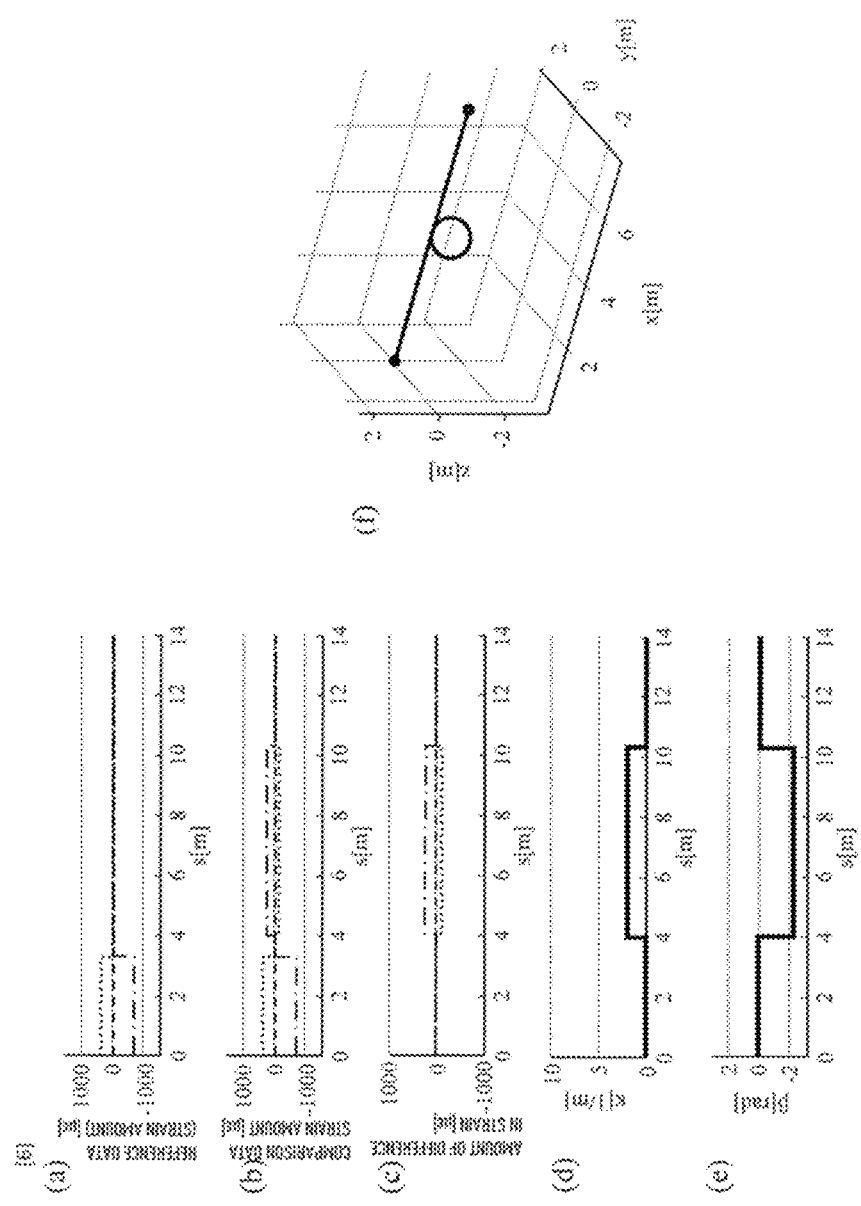
FIG. 6 is drawings describing a measurement example with the shape measurement system according to the present invention.

FIG. 6 is drawings describing a first example in which the three-dimensional shape of the multi-core optical fiber 10 is measured by the shape measurement method. In FIGS. 6(a) to (e), the distance in the longitudinal direction of the multi-core optical fiber 10 (the position z described above) is expressed in s[m]. In FIG. 6(f), the three-dimensional space in which the multi-core optical fiber 10 is arranged is expressed by an x-axis, a y-axis, and a z-axis. Note that the z-axis in here is different from the position z described above.

In the working example, the reference data of Step A in FIG. 5 was acquired in a state where the multi-core optical fiber 10 for sensing was extended in a straight line. Next, a vicinity of the center of the multi-core optical fiber 10 was rotated clockwise at a constant curvature to acquire the comparison data of Step B in FIG. 5. FIGS. 6(a), (b), and (c) are results of the reference data of Step A, the comparison data of Step B, and the difference in strain of Step C in FIG. 5, respectively. A dotted line, a dashed line, and a one dot chain line in the drawings each represent the difference of the outer peripheral cores. FIGS. 6(d) and (e) illustrate evaluation results of the curvature κ and the angle β of the multi-core optical fiber 10, respectively. FIG. 6(f) illustrates space coordinates of the multi-core optical fiber 10 in consideration of the position vector, and the curvature given to the vicinity of the center of the multi-core optical fiber 10 can be accurately detected.

Working Example 2

Figure 7:
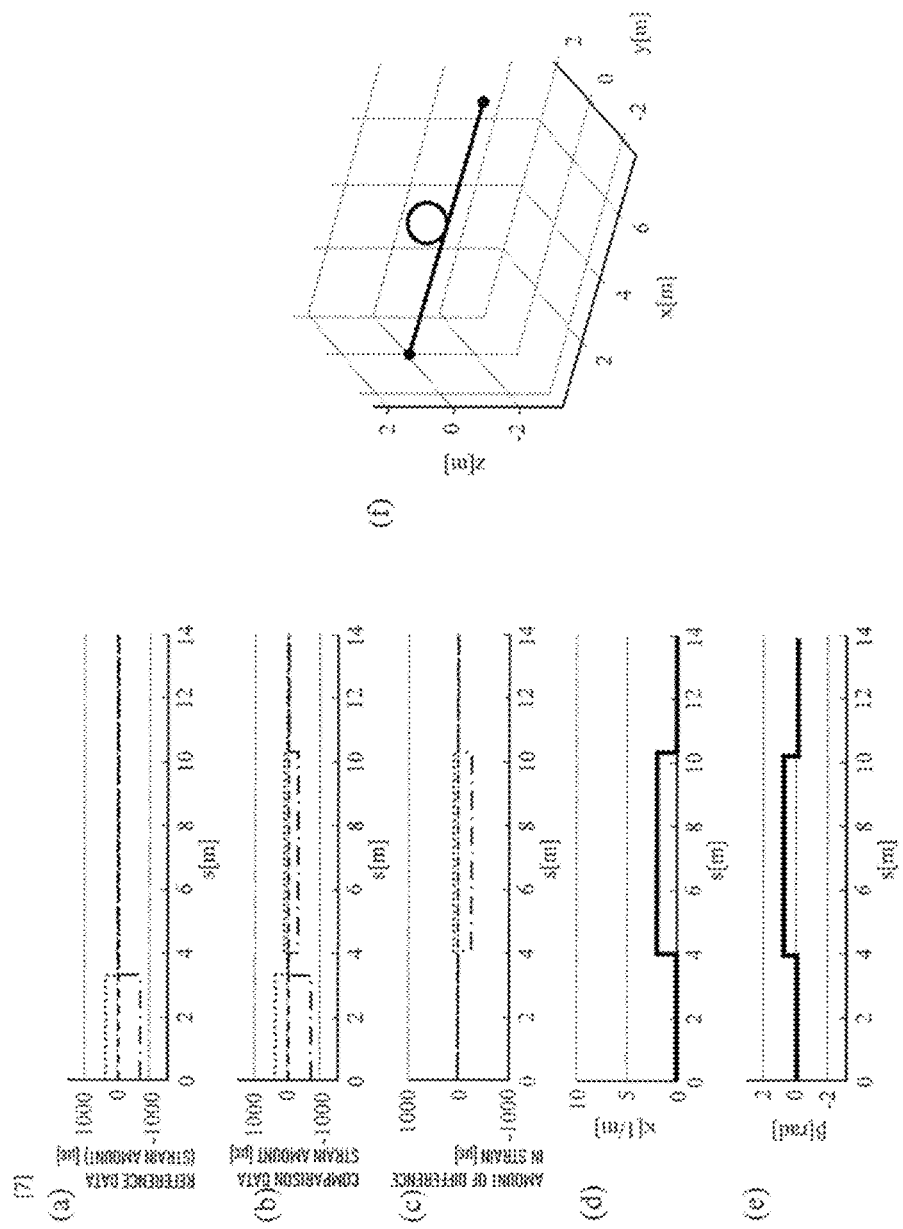
FIG. 7 is drawings describing a measurement example with the shape measurement system according to the present invention.

FIG. 7 is drawings describing a second example in which the three-dimensional shape of the multi-core optical fiber 10 is measured by the shape measurement method. In FIGS. 7(a) to (e), the distance in the longitudinal direction of the multi-core optical fiber 10 (the position z described above) is also expressed in s[m]. In FIG. 7(f), the three-dimensional space in which the multi-core optical fiber 10 is arranged is also expressed by the x-axis, the y-axis, and the z-axis. Note that the z-axis in here is different from the position z described above.

In the working example, the reference data of Step A in FIG. 5 was acquired in a state where the multi-core optical fiber 10 for sensing was extended in a straight line. Next, the vicinity of the center of the multi-core optical fiber 10 was rotated counterclockwise at a constant curvature to acquire the comparison data of Step B in FIG. 5. FIGS. 7(a), (b), and (c) are results of the reference data of Step A, the comparison data of Step B, and the difference in strain of Step C in FIG. 5, respectively. A dotted line, a dashed line, and a one dot chain line in the drawings each represent the difference of the outer peripheral cores. FIGS. 7(d) and (e) illustrate evaluation results of the curvature κ and the angle β of the multi-core optical fiber 10, respectively. FIG. 7(f) illustrates the space coordinates of the multi-core optical fiber 10 in consideration of the position vector, and a shape change in an opposite direction (counterclockwise) of FIG. 6(f) can be accurately detected.

Embodiment 2

When a multi-core optical fiber is placed along a structural object as a sensing medium, an unintended twist may occur, and an error may be caused in a measurement result. Therefore, in the embodiment, a twist is purposely added to the multi-core optical fiber used as the sensing medium. In shape identification of a linear structural object, a strain by an unintended twist, which is its twisting strain or below, can be eliminated by a calculation, and accuracy of the shape identification can be improved.

A system configuration of the shape measurement system of the embodiment is different from the system configuration of the shape measurement system described in FIG. 1 in an already-known twist being provided to the multi-core optical fiber 10 and in an analysis procedure of the analysis device 30.

FIG. 8 is drawings describing the multi-core optical fiber 10. FIG. 8(A) describes a bending strain measured in the multi-core optical fiber 10 in a state where a twist does not exist, and FIG. 8(B) describes a bending strain measured in the multi-core optical fiber 10 in a state where a twist exists. A core 0 is the center core, and a core 1 to a core 3 are the outer peripheral cores.

When the bending strains do not exist, the bending strains become zero for all the cores and overlap irrespective of the existence of a twist. For the center core, the bending strain becomes zero irrespective of the existence of a twist. In a case of the multi-core optical fiber 10 in the state where a twist does not exist, while the bending strain measured when a bending having a constant curvature is given is a different strain amount for each core as illustrated between an axial position z=2 m and z=12 m in FIG. 8(A), the constant strain amounts are observed.

FIG. 8(B) describes the bending strain of the multi-core optical fiber 10 to which a twist is given between the axial position z=2 m and z=12 m. In FIG. 8(B), similarly to FIG. 8(A), while a bending having a constant curvature is given, the outer peripheral cores switch the positions by the twist in a section where the bending is given, and therefore, inversion of positives and negatives of the strain amounts can be confirmed. When the multi-core optical fiber 10 is arranged to a linear structural object as a sensing medium, the twist is required for all the section arranged to the linear structural object.

When the positional coordinates are computed, based on a twisting strain generated in the multi-core optical fiber 10 and a strain by the already-known twist, the analysis device 30 estimates an unintended twist generated when the multi-core optical fiber 10 is arranged along the linear structural object having an unknown three-dimensional shape, and removes an influence by the unintended twist.

Figure 4:
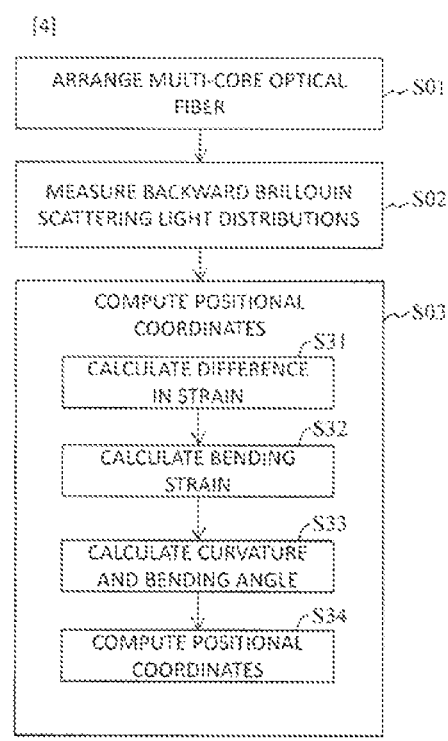
FIG. 4 is a drawing describing a shape measurement method according to the present invention.

In the shape measurement method, Step S33 described in the shape measurement method of FIG. 4 is different from the description of Embodiment 1. That is, in Step S03, calculating a difference in strain at the position z that is a difference between a strain amount at the position z of each core of the multi-core optical fiber obtained from the backward Brillouin scattering light distribution when the multi-core optical fiber is arranged along the linear structural object having an unknown three-dimensional shape and a strain amount at the position z of each core of the multi-core optical fiber obtained from the backward Brillouin scattering light distribution when the multi-core optical fiber is arranged along the linear structural object having an already-known three-dimensional shape (Step S31), calculating a bending strain $\varepsilon_{bending,i}$ of each of the outer peripheral cores by subtracting the difference in strain of the center core from the difference in strain of each of the outer peripheral cores (Step S32), calculating a curvature κ and a bending angle β at the position z of the multi-core optical fiber from the bending strain $\varepsilon_{bending,i}$ of each of the outer peripheral cores using a relational expression (2) of removing an influence by the unintended twist (Step S33), and computing the positional coordinates in a three-dimensional space of the linear structural object having an unknown three-dimensional shape from the curvature κ and the bending angle β at the position z using the Frenet-Serret formulas (Step S34), are performed.

Figure 9:
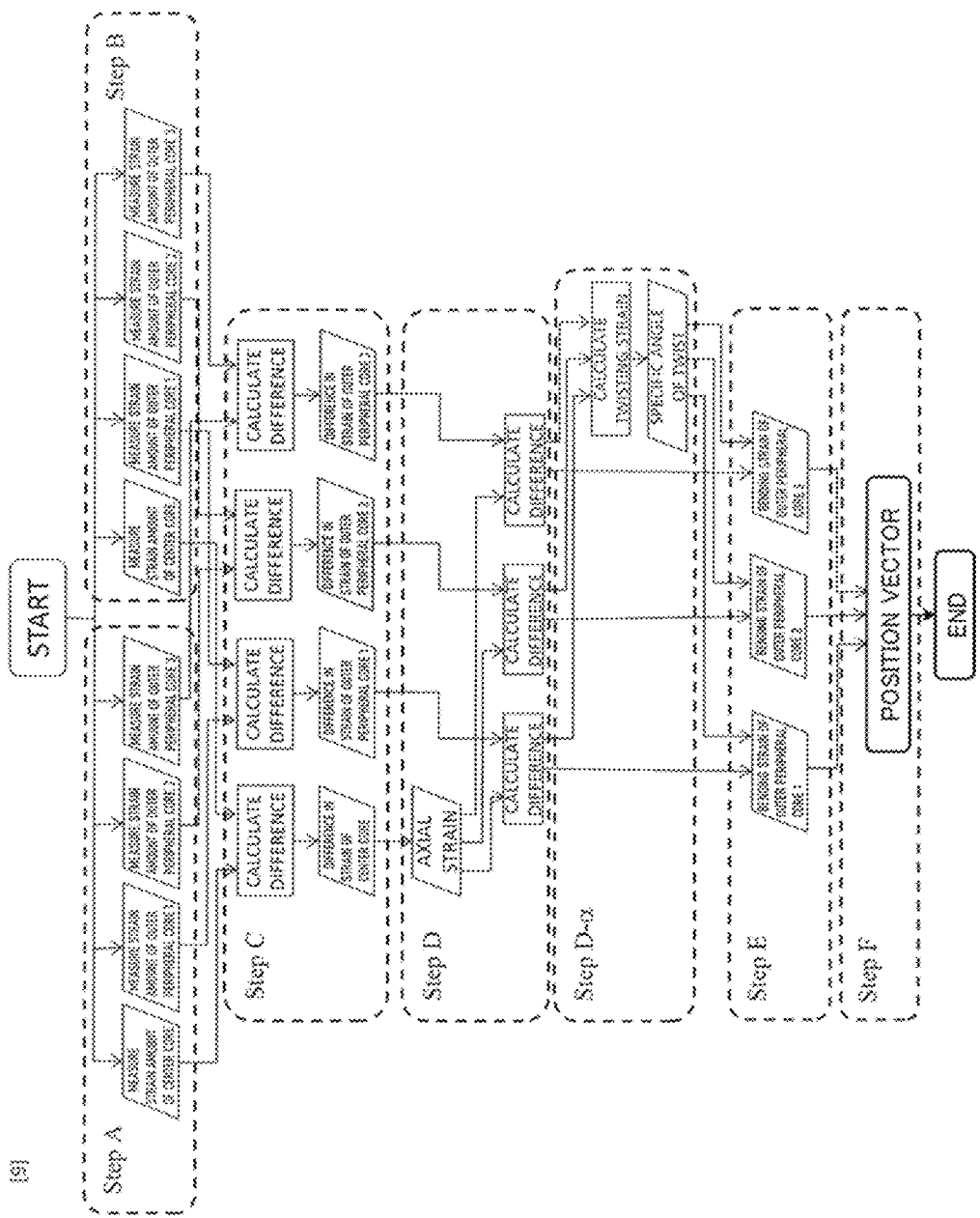
FIG. 9 is a drawing describing the shape measurement method according to the present invention.

FIG. 9 is a drawing describing a specific procedure when the linear structural object having an unknown three-dimensional shape is measured by the shape measurement method. Here, "i" is a core number. Note that i=0 is the center core, and i of 1 or larger is an outer peripheral core.

[Step A]

First, the multi-core optical fiber 10 is laid along a linear structural object having an already-known three-dimensional shape (for example, a water service pipe or the like that is already laid), and a distribution property of a backward Brillouin scattering light of each core in a steady state (reference state) is acquired. This is defined as reference data.

[Step B]

Next, a distribution property of the backward Brillouin scattering light of each core is acquired again in a state where the three-dimensional shape of the linear structural object is changed (for example, a water service pipe or the like that is assumed to be deformed due to an earthquake or the like). This is defined as comparison data.

[Step C]

Next, a difference between the comparison data and the reference data is calculated for each core and for each position z to derive a difference in strain.

[Step D]

Next, the difference in strain of the center core is subtracted from the difference in strain of each of the outer peripheral cores to derive a strain $\varepsilon_{mix,i}$ at the position z for each of the outer peripheral cores (here, i is 1 or larger).

[Step D-α]

The strain $\varepsilon_{mix,i}$ includes the bending strain $\varepsilon_{bending,i}$ and a twisting strain $\varepsilon_{twisting}$ (here, i is 1 or larger). Since a relative positional relationship of the outer peripheral cores does not change, the twisting strain $\varepsilon_{twisting}$ at the position z is computed as by the following formula by using the fact that adding the bending strains $\varepsilon_{bending,i}$ of all the outer peripheral cores i becomes zero. max{i} means a maximum core number.

[Math. 7]

$$\varepsilon_{twisting} = \frac{\sum_{i=1}^{i} \varepsilon_{mix,i}}{\max\{i\}} \quad (7)$$

The twisting strain $\varepsilon_{twisting}$ computed by Formula (7) is assigned to Formula (5) to compute a specific angle of twist φ(z) at the position z. FIG. 11 is a conceptual diagram describing a specific angle of twist φ. The specific angle of twist φ is a twist angle per unit length.

[Math. 5]

$$\phi(z) = \frac{\varepsilon_{twisting}}{k_2 r} \quad (5)$$

Here, r is a distance from the center on the cross section of the multi-core optical fiber 10 to the centers of the outer peripheral cores. k2 is a correction coefficient of a twist and expressed by the following formula. p is a spin rate (twist amount per unit length) of the outer peripheral cores and a value on design or a value obtained by a measurement method described later.

[Math. 6]

$$k_2 = \frac{2\pi p r}{(2\pi p r)^2 + 1} \quad (6)$$

[Step E]

The bending strain $\varepsilon_{bending,i}$ of the outer peripheral core i is computed by subtracting $\varepsilon_{twisting}$ derived in Step D-α from the strain $\varepsilon_{mix,i}$ of each of the outer peripheral cores.

Then, the specific angle of twist φ(z) computed by Formula (5) is assigned to Formula (4) to compute an angle $\omega_i$ representing a position of the outer peripheral core i at the position z. $a_i$ is an initial angle of the outer peripheral core i.

[Math. 4]

$$\omega_i = a_i + \int_0^s (2\pi p + \phi(z)) dz \quad (4)$$

Furthermore, the bending strain $\varepsilon_{bending,i}$ of the outer peripheral core i and the angle $\omega_i$ derived by Formula (4) are assigned to the relational expression (2) of the curvature κ and the bending angle β of the multi-core optical fiber 10.

$$\Sigma_{bending,i} = k_1 \kappa r \cos(\omega_i - \beta) \quad \text{[Relational Expression (2)]}$$

Where $k_1$ is a correction coefficient of a twist expressed by Formula (3).

[Math. 3]

$$k_1 = \frac{1 - \nu(2\pi p r)^2}{(2\pi p r)^2 + 1} \quad (3)$$

where ν is a Poisson's ratio of the multi-core optical fiber.

In the embodiment, since there are three outer peripheral cores, simultaneous equations with three variables are obtained. From the relational expression (2), the curvature κ and the bending angle β at the position z are computed. Here, although the bending strain ε is different for each core, the curvature κ and the bending angle β are equal for any core, and therefore, the curvature κ and the bending angle β at the position z are determined by the least-square method.

FIG. 10 is conceptual diagrams describing a radius r, a bending direction (curvature κ), and a bending angle β of a multi-core optical fiber having three outer peripheral cores. FIG. 10(A) is a drawing viewed from a side surface of the multi-core optical fiber, and FIG. 10(B) is a cross-sectional view of the multi-core optical fiber.

[Step F]

Using the Frenet-Serret formulas, from the curvature κ and the bending angle β for each distance z determined in Step E, a position vector (three-dimensional shape) of the multi-core optical fiber 10 is determined. In order to improve position accuracy, the three-dimensional shape is preferably corrected using an already-known ending point.

(Measurement Method of Spin Rate)

Here, a method of actually measuring the spin rate will be described.

Figure 12:
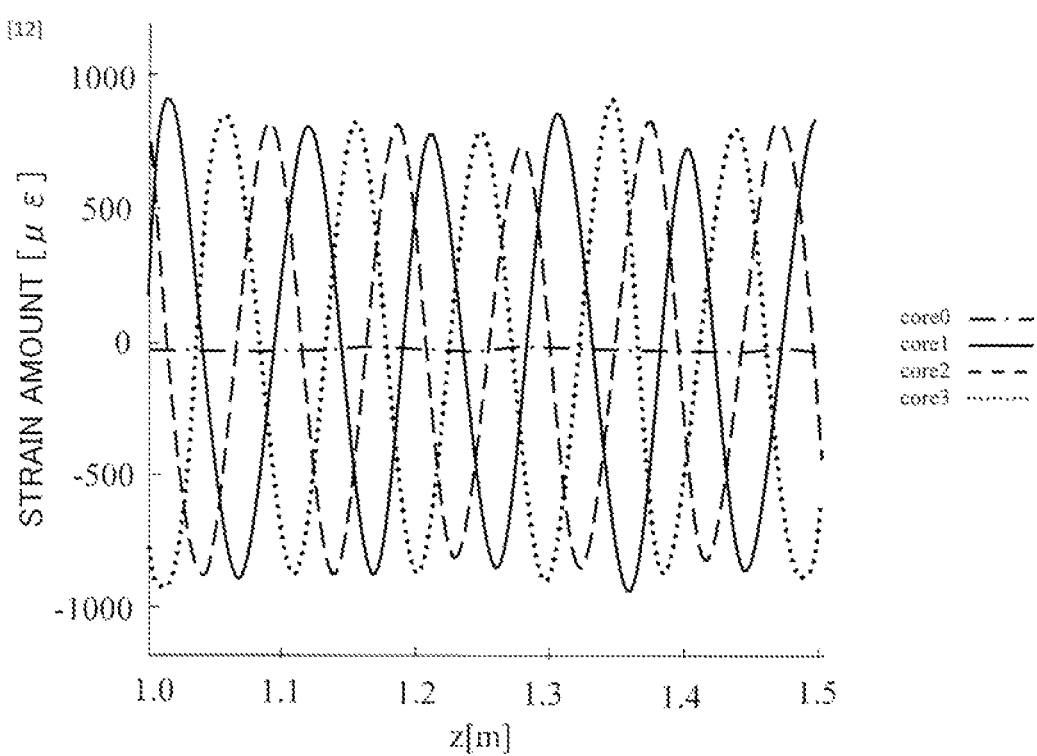
FIG. 12 is a drawing describing a method of actually measuring a spin rate of a multi-core optical fiber.

FIG. 12 is a drawing illustrating a result of measuring in a z direction a strain of each core of a multi-core optical fiber to which a twist is applied. When the multi-core optical fiber is twisted, an error occurs between the number of twists (spin rate) and a design value due to a manufacturing error and the like. In view of this, a strain cycle fluctuates for each core. Therefore, the number of twists (spin rate) is computed from a cyclic strain fluctuation by a short-time Fourier transform (STFT). In the above-described Step D-α, a value of a spin rate p computed from the actually measured strain cycle can be used.

(Effect)

The shape measurement system according to the present invention can achieve a measurement dynamic range of several kilometers to several tens of kilometers by using a backward Brillouin scattering light in shape identification of a linear structural object. Additionally, by setting the center-to-center distance between a center core and an outer peripheral core of a multi-core optical fiber used for detection of a shape change to 120 μm or more, a slight change of a curvature of 0.5[1/m] or less can be detected.

REFERENCE SIGNS LIST

10 Multi-core optical fiber
11 Center core
12 Outer peripheral core
20 Measuring device
30 Analysis device

The invention claimed is:

1. A shape measurement system comprising:
a multi-core optical fiber including a center core arranged in a center of a cross section of the multi-core optical fiber and three or more outer peripheral cores arranged at equal intervals on an outside of the center core and in a concentric manner;
a measuring device that measures a backward Brillouin scattering light distribution in a propagation direction of each core of the multi-core optical fiber; and
an analysis device that computes positional coordinates in a three-dimensional space of a linear structural object having an unknown three-dimensional shape from the backward Brillouin scattering light distribution of the multi-core optical fiber arranged along the linear structural object having the unknown three-dimensional shape and the multi-core optical fiber arranged along a linear structural object having an already-known three-dimensional shape.

2. The shape measurement system according to claim 1, wherein
when a position in a longitudinal direction of the multi-core optical fiber is defined as z,
the analysis device performs:
calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape;
calculating a bending strain ε of each of the outer peripheral cores by subtracting the difference in strain of the center core from the difference in strain of each of the outer peripheral cores;
calculating a curvature κ and a bending angle β at the position z of the multi-core optical fiber from the bending strain ε of each of the outer peripheral cores using a relational expression (1); and
computing positional coordinates in the three-dimensional space of the linear structural object having the unknown three-dimensional shape from the curvature κ and the bending angle β at the position z using Frenet-Serret formulas;

$$\varepsilon = r \cdot \kappa \cdot \cos(\alpha - \beta) \quad \text{[Relational Expression (1)]}$$

where r is a center-to-center distance between the center core and the outer peripheral cores, and α is an angle representing a position of the outer peripheral core on a cross section of the multi-core optical fiber.

3. The shape measurement system according to claim 1, wherein
the multi-core optical fiber is provided with an already-known twist, and
when the positional coordinates are computed, the analysis device estimates an unintended twist generated when the multi-core optical fiber is arranged along the linear structural object having the unknown three-dimensional shape, based on a twisting strain generated in the multi-core optical fiber and a strain by the already-known twist, and removes an influence by the unintended twist.

4. The shape measurement system according to claim 3, wherein
when a position in a longitudinal direction of the multi-core optical fiber is defined as z,
the analysis device performs:
calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape;
calculating a bending strain $\varepsilon_{bending,i}$ of each of the outer peripheral cores by subtracting the difference in strain of the center core from the difference in strain of each of the outer peripheral cores;
calculating a curvature κ and a bending angle β at the position z of the multi-core optical fiber from the bending strain $\varepsilon_{bending,i}$ of each of the outer peripheral cores using a relational expression (2) of removing an influence by the unintended twist; and
computing positional coordinates in the three-dimensional space of the linear structural object having the unknown three-dimensional shape from the curvature κ and the bending angle β at the position z using Frenet-Serret formulas;

$$\varepsilon_{bending,i} = k_1 \kappa r \cos(\omega_i - \beta) \quad \text{[Relational Expression (2)]}$$

where r is a center-to-center distance between the center core and the outer peripheral cores, $k_1$ is a correction coefficient of a twist expressed by Formula (3), v is a Poisson's ratio of the multi-core optical fiber, $a_i$ is an initial angle of a core i, $\omega_i$ is an angle representing a position of the outer peripheral cores on a cross section at the position z of the multi-core optical fiber expressed by Formula (4), p is a spin rate of the outer peripheral cores, $\varepsilon_{twisting}$ is a twisting strain generated at the position z of the multi-core optical fiber, φ(z) is a specific angle of twist at the position z of the multi-core optical fiber expressed by Formula (5), and $k_2$ is a correction coefficient of a twist expressed by Formula (6)

[Math. 3]
$$k_1 = \frac{1 - \nu(2\pi pr)^2}{(2\pi pr)^2 + 1} \quad (3)$$

[Math. 4]
$$\omega_i = a_i + \int_0^S (2\pi p + \phi(z))dz \quad (4)$$

[Math. 5]
$$\phi(z) = \frac{\varepsilon_{twisting}}{k_2 r} \quad (5)$$

[Math. 6]
$$k_2 = \frac{2\pi pr}{(2\pi pr)^2 + 1}. \quad (6)$$

5. The shape measurement system according to claim 4, wherein
the analysis device computes a spin rate p of the outer peripheral cores from a cyclic fluctuation of the bending strain $\varepsilon_{bending,i}$ of each of the outer peripheral cores.

6. The measurement system according to claim 1, wherein in the multi-core optical fiber, a count of the outer peripheral cores is three, and a cladding diameter is 375 μm or more.

7. The measurement system according to claim 1, wherein in the multi-core optical fiber, a center-to-center distance between the center core and the outer peripheral cores is 120 μm or more.

8. A shape measurement method comprising:
arranging a multi-core optical fiber having a center core arranged in a center of a cross section of the multi-core optical fiber and three or more outer peripheral cores arranged at equal intervals on an outside of the center core and in a concentric manner along a linear structural object;
measuring a backward Brillouin scattering light distribution in a propagation direction of each core of the multi-core optical fiber; and
computing positional coordinates in a three-dimensional space of a linear structural object having an unknown three-dimensional shape from the backward Brillouin scattering light distribution of the multi-core optical fiber arranged along the linear structural object having the unknown three-dimensional shape and the multi-core optical fiber arranged along a linear structural object having an already-known three-dimensional shape.

9. The shape measurement method according to claim 8, comprising:
defining a position in a longitudinal direction of the multi-core optical fiber as z when computing positional coordinates in a three-dimensional space of the linear structural object having the unknown three-dimensional shape;
calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape;
calculating a bending strain ε of each of the outer peripheral cores by subtracting the difference in strain of the center core from the difference in strain of each of the outer peripheral cores;
calculating a curvature κ and a bending angle β at the position z of the multi-core optical fiber from the bending strain ε of each of the outer peripheral cores using a relational expression (1); and
computing positional coordinates in the three-dimensional space of the linear structural object having the unknown three-dimensional shape from the curvature κ and the bending angle β at the position z using Frenet-Serret formulas;

$\varepsilon = r \cdot \kappa \cdot \cos(\alpha - \beta)$         [Relational Expression (1)]

where r is a center-to-center distance between the center core and the outer peripheral cores, and α is an angle representing a position of the outer peripheral cores on a cross section of the multi-core optical fiber.

10. The shape measurement method according to claim 8, wherein
the multi-core optical fiber is provided with an already-known twist, and
when the positional coordinates are computed, an unintended twist generated when the multi-core optical fiber is arranged along the linear structural object having the unknown three-dimensional shape is estimated, based on a twisting strain generated in the multi-core optical fiber and a strain by the already-known twist, and an influence by the unintended twist is removed.

11. The shape measurement method according to claim 10, comprising:
defining a position in a longitudinal direction of the multi-core optical fiber as z when computing positional coordinates in a three-dimensional space of the linear structural object having the unknown three-dimensional shape;
calculating a difference in strain at the position z as a difference between a strain amount at the position z of each core of the multi-core optical fiber obtained from the backward Brillouin scattering light distribution when the multi-core optical fiber is arranged along the linear structural object having the unknown three-dimensional shape and a strain amount at the position z of each core of the multi-core optical fiber obtained from the backward Brillouin scattering light distribution when the multi-core optical fiber is arranged along the linear structural object having the already-known three-dimensional shape;
calculating a bending strain $\varepsilon_{bending,i}$ of each of the outer peripheral cores by subtracting the difference in strain of the center core from the difference in strain of each of the outer peripheral cores;
calculating a curvature κ and a bending angle β at the position z of the multi-core optical fiber from the bending strain $\varepsilon_{bending,i}$ of each of the outer peripheral cores using a relational expression (2) of removing an influence by the unintended twist; and
computing positional coordinates in the three-dimensional space of the linear structural object having the unknown three-dimensional shape from the curvature κ and the bending angle β at the position z using Frenet-Serret formulas;

$\varepsilon_{bending,i} = k_1 \kappa r \cos(\omega_i - \beta)$     [Relational Expression (2)]

where r is a center-to-center distance between the center core and the outer peripheral cores, $k_1$ is a correction coefficient of a twist expressed by Formula (3), v is a Poisson's ratio of the multi-core optical fiber, $a_i$ is an initial angle of a core i, $\omega_i$ is an angle representing a position of the outer peripheral cores on a cross section at the position z of the multi-core optical fiber expressed by Formula (4), p is a spin rate of the outer peripheral cores, $\varepsilon_{twisting}$ is a twisting strain generated at the position z of the multi-core optical fiber, $\varphi(z)$ is a specific angle of twist at the position z of the multi-core optical fiber expressed by Formula (5), and $k_2$ is a correction coefficient of a twist expressed by Formula (6)

[Math. 3]

$$k_1 = \frac{1 - v(2\pi pr)^2}{(2\pi pr)^2 + 1} \quad (3)$$

[Math. 4]

$$\omega_i = a_i + \int_0^s (2\pi p + \phi(z))dz \quad (4)$$

[Math. 5]

$$\phi(z) = \frac{\varepsilon_{twisting}}{k_2 r} \quad (5)$$

[Math. 6]

$$k_2 = \frac{2\pi pr}{(2\pi pr)^2 + 1}. \quad (6)$$

12. The shape measurement method according to claim 11, wherein
a spin rate p of the outer peripheral cores is computed from a cyclic fluctuation of the bending strain $\varepsilon_{bending,i}$ of each of the outer peripheral cores.

13. The shape measurement method according to claim 8, wherein
in the multi-core optical fiber, a count of the outer peripheral cores is three, and a cladding diameter is 375 μm or more.

14. The shape measurement method according to claim 8, wherein
in the multi-core optical fiber, a center-to-center distance between the center core and the outer peripheral cores is 120 μm or more.

* * * * *